United States Patent
Kronzer et al.

(10) Patent No.: US 6,703,086 B2
(45) Date of Patent: *Mar. 9, 2004

(54) PRINTABLE MATERIAL

(75) Inventors: Francis Joseph Kronzer, Woodstock, GA (US); Leonard Eugene Zelazoski, Kennesaw, GA (US); Ty Jackson Stokes, Suwanee, GA (US); Jeffrey Lawrence McManus, Canton, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/766,266

(22) Filed: Jan. 19, 2001

(65) Prior Publication Data

US 2001/0031341 A1 Oct. 18, 2001

Related U.S. Application Data

(62) Division of application No. 09/041,789, filed on Mar. 13, 1998, now Pat. No. 6,265,053.

(51) Int. Cl.$^7$ .................................................. B41M 5/00
(52) U.S. Cl. ..................... 428/32.16; 156/235; 347/105; 428/32.18
(58) Field of Search ................................. 428/195, 198, 428/211, 500, 32.16, 32.18; 156/235; 347/105

(56) References Cited

U.S. PATENT DOCUMENTS

| | | | |
|---|---|---|---|
| 3,849,241 A | 11/1974 | Butin et al. ................ 161/169 |
| 4,113,911 A | 9/1978 | LaFitte et al. .............. 428/284 |
| 4,731,215 A | 3/1988 | Schwarz ..................... 264/517 |
| 4,770,934 A | 9/1988 | Yamasaki et al. ........... 428/331 |
| 5,108,827 A | 4/1992 | Gessner ..................... 428/219 |
| 5,200,242 A | 4/1993 | Hohmann ................... 428/40 |
| 5,234,734 A | 8/1993 | Hamada ..................... 428/40 |
| 5,242,739 A | 9/1993 | Kronzer et al. ............. 428/200 |
| 5,271,990 A | 12/1993 | Kronzer et al. ............. 428/195 |
| 5,352,507 A | 10/1994 | Bresson et al. ............. 428/245 |
| 5,458,590 A | 10/1995 | Schleinz .................... 604/361 |
| 5,501,902 A | 3/1996 | Kronzer .................... 428/323 |
| 5,503,076 A | 4/1996 | Yeo .......................... 101/483 |
| 5,597,642 A | 1/1997 | Schleinz et al. ............ 428/195 |
| 5,612,118 A | 3/1997 | Schleinz et al. ............ 428/195 |
| 5,759,673 A * | 6/1998 | Okezawa et al. ........... 428/198 |
| 5,798,179 A | 8/1998 | Kronzer .................... 428/411.1 |
| 5,827,788 A | 10/1998 | Miyakoshi ................. 442/164 |
| 6,017,611 A | 1/2000 | Cheng et al. ............... 428/195 |
| 6,028,028 A * | 2/2000 | Nitta ......................... 503/200 |

FOREIGN PATENT DOCUMENTS

| | | | |
|---|---|---|---|
| EP | 0575959 A1 | 12/1993 | ............ B41M/5/40 |
| EP | 0764550 A2 | 3/1997 | ............ B44C/5/04 |
| GB | 2284384 A | 7/1995 | ............ B32B/7/14 |
| WO | WO 96/06729 | 3/1996 | ............ B30B/5/02 |
| WO | WO 97/01448 | 1/1997 | ............ B41M/5/00 |

* cited by examiner

*Primary Examiner*—Bruce H. Hess
(74) *Attorney, Agent, or Firm*—Nelson, Mullins Riley & Scarborough

(57) ABSTRACT

A printable material which includes a flexible first layer having first and second surfaces and a second layer. The first layer may be a film or a cellulosic nonwoven web. The second layer overlays and is bonded to the first surface of the first layer and includes a nonwoven web. The first layer has a basis weight of from about 20 to about 140 grams per square meter. The thermoplastic polymer has a melting point of from about 90° C. to about 250° C. and the second layer has a basis weight of at least about 10 grams per square meter. The first layer may be a cellulosic nonwoven web, such as a latex-impregnated paper. The second layer may be thermally bonded to the first layer or bonded by an adhesive. A release layer may be present between the first layer and the heat-activated adhesive. The second layer may contain from about 0.1 to about 20 percent by weight, based on the weight of the second layer, of a material which increases the viscosity of an ink jet ink when printed on the second layer. The second layer also may contain from about 0.1 to about 5 percent by weight, based on the weight of the second layer, of a cationic polymer. When the second layer is prepared from a thermoplastic polymer, the ink jet printable material may be used as a heat transfer material. Methods of preparing the printable material also are described.

14 Claims, No Drawings

PRINTABLE MATERIAL

CROSS REFERENCE TO RELATED APPLICATIONS

This application is a divisional of application Ser. No. 09/041,789, which was filed on Mar. 13, 1998, now U.S. Pat. No. 6,265,053.

BACKGROUND OF THE INVENTION

The present invention relates to a printable material, such as an ink jet printable material. In certain embodiments, the present invention relates to a heat transfer material.

The popularity in recent years of personal computers in homes and businesses has stimulated the development of several types of printers. The earlier, relatively low cost printers were impact or dot-matrix printers which utilized a ribbon and a plurality of pins to place a desired image on a substrate which typically was paper. While the better dot-matrix printers are capable of near letter-quality printing, they typically are both slow and noisy. Laser printers are quiet, produce high-quality images, and can print an excess of four pages per minute. Such printers, however, tend to be too expensive for common use in homes and even in some smaller businesses; this is especially true for color laser printers. Ink jet printers fill the gap between dot-matrix printers and laser printers, both with respect to cost and image quality.

The advent of improved, relatively low cost color printers has aided the development of a significant industry which involves the application of customer-selected designs, messages, illustrations, and the like (referred to collectively hereinafter as "customer-selected graphics") on articles of clothing, such as T-shirts, sweat shirts, and the like. These customer-selected graphics typically are commercially available products tailored for that specific end-use and are printed on a release or transfer paper. They are applied to the article of clothing by means of heat and pressure, after which the release or transfer paper is removed.

Some effort has been directed to allowing customers the opportunity to prepare their own graphics for application to an article of clothing. The preparation of such graphics may involve the use of colored crayons made from a heat-transferable material. Such crayons have been made available in kit form, which also includes an unspecified heat transfer sheet having an outlined pattern thereon. In a variation of the kit, the transferable pattern is created from a manifold of a heat transfer sheet and a reverse or lift-type copy sheet having a pressure transferable coating of heat transferable material thereon. By generating the pattern or artwork on the obverse face of the transfer sheet with the pressure of a drafting instrument, a heat transferable mirror image pattern is created on the rear surface of the transfer sheet by pressure transfer from the copy sheet. The heat transferable mirror image then can be applied to a T-shirt or other article by heat transfer.

The creation of personalized, creative designs or images on a fabric such as a T-shirt or the like through the use of a personal computer system has been described. The method involves electronically generating an image, electronically transferring the image to a printer, printing the image with the aid of the printer on an obverse surface of a transfer sheet which has a final or top coating consisting essentially of Singapore Dammar Resin, positioning the obverse face of the transfer sheet against the fabric, and applying energy to the rear of the transfer sheet to transfer the image to the fabric. The transfer sheet can be any commercially available transfer sheet, the heat-transferable coating of which has been coated with an overcoating of Singapore Dammar Resin. The use of abrasive particles in the Singapore Dammar Resin coating also has been described. The abrasive particles serve to enhance the receptivity of the transfer sheet to various inks and wax-based crayons.

Additionally, improved heat transfer papers having an enhanced receptivity for images made by wax-based crayons, thermal printer ribbons, and impact ribbon or dot-matrix printers have been disclosed. For example, a cellulosic base sheet has an image-receptive coating containing from about 15 to about 80 percent of a film-forming binder and from about 85 to about 20 percent by weight of a powdered polymer consisting of particles having diameters from about 2 to about 50 micrometers. The binder typically is a latex. Alternatively, a cellulosic base sheet has an image-receptive coating which typically is formed by melt extrusion or by laminating a film to the base sheet. The surface of the coating or film then is roughened by, for example, passing the coated base sheet through an embossing roll.

Some effort also has been directed at generally improving the transfer of an image-bearing laminate to a substrate. For example, an improved release has been described, in which upon transfer the release splits from a carrier and forms a protective coating over the transferred image. The release is applied as a solution and contains a montan wax, a rosin ester or hydrocarbon resin, a solvent, and an ethylene-vinyl acetate copolymer having a low vinyl acetate content.

Additional effort has been directed to improving the adhesion of the transferred laminate to porous, semi-porous, or non-porous materials, and the development of a conformable transfer layer which enables the melt transfer web to be used to transfer images to uneven surfaces.

It is well known by those having ordinary skill in the art that current ink jet inks are aqueous-based systems. That is, the dyes employed in such inks are soluble in water. Thus, substrates printed with ink jet inks have a pronounced proclivity to run or even lose an image in the presence of moisture or water. Moreover, customer-selected graphics produced by desk-top publishing software and printed by ink jet printers result in graphics which in general are not transferred satisfactorily by known heat transfer papers. This is particularly true when transfer is attempted with a hand-held iron. Consequently, there is an opportunity for an improved heat transfer paper which has been developed specifically for graphics printed with an ink jet printer, i.e., an ink-jet printable heat transfer paper. There also is an opportunity for an improved heat transfer paper which has improved durability, especially in the presence of water, and which results in a softer, more pliable transferred image. More generally, there is an opportunity for an improved material which has been developed specifically for graphics printed with an ink jet printer, wherein the printed graphics will have improved durability, especially in the presence of water.

SUMMARY OF THE INVENTION

The present invention addresses some of the difficulties and problems discussed above by providing a printable material which includes a flexible first layer having first and second surfaces and a second layer. The first layer may be a film or a fibrous sheet-like material. For example, the fibrous sheet-like material may be a cellulosic nonwoven web. As another example, the first layer may be a latex-impregnated paper.

The second layer overlays and is bonded to the first surface of the first layer and includes a nonwoven web formed from a natural or synthetic polymer. Natural polymers include hydrocarbons such as rubber and gutta percha (polyisoprene). A synthetic polymer generally may be a thermosetting or a thermoplastic polymer. The first layer may have a basis weight of from about 20 to about 140 grams per square meter (gsm). The second layer may have a basis weight of at least about 10 gsm. For example, the second layer may have a basis weight of from about 10 gsm to about 115 gsm. As another example, the second layer may have a basis weight of from about 17 gsm to about 115 gsm.

The second layer generally is bonded to the first layer by any means known to those having ordinary skill in the art. For example, the second layer may be bonded to the first surface of the first layer by means of an adhesive. As an example, the adhesive may be a heat-activated adhesive, such as an ethylene-acrylic acid copolymer. If desired, a release layer may be present between the first layer and the adhesive. Other adhesives, such as wet adhesives, curable adhesives, and the like may be employed.

Alternatively, the second layer may be thermally bonded to the first surface of the first layer. This may be accomplished by placing a meltable web between the two layers and heating them in a press at a temperature sufficient to at least partially soften or melt the meltable web. The meltable web typically will be prepared from a thermoplastic polymer having a suitably low softening or melting point. The use of such webs is well known to those having ordinary skill in the art. When the second layer has been prepared from a thermoplastic polymer, a separate meltable web typically is not required; the first and second layers may be heated in a press at a temperature sufficient to partially soften or melt at least a portion of the second layer which is adjacent to the first layer.

The present invention also provides an ink jet printable material which includes a flexible first layer having first and second surfaces and a second layer. The first layer may be a film or a fibrous sheet-like material as described above. The second layer overlays and is bonded to the first surface of the first layer as described above, and includes a nonwoven web formed from a natural or synthetic polymer, again as described above. The second layer contains from about 0.1 to about 20 percent by weight, based on the weight of the polymer of which the second layer is composed, of a material which increases the viscosity of an ink jet ink when printed on the second layer. Such material may be, by way of illustration only, a poly(vinyl alcohol) or a polyoxyethylene. The second layer also may contain from about 0.1 to about 5 percent by weight, again based on the weight of the of the polymer of which the second layer is composed, of a cationic polymer.

The present invention further provides an ink jet printable heat transfer material which includes a flexible first layer having first and second surfaces and a second layer as already described. The first layer may be a film or a fibrous sheet-like material. For example, the fibrous sheet-like material may be a cellulosic nonwoven web. As another example, the first layer may be a latex-impregnated paper.

The second layer overlays and is bonded to the first surface of the first layer and includes a nonwoven web formed from a thermoplastic polymer. For example, the second layer may be a meltblown web formed from, by way of example only, a polyamide. The first layer may have a basis weight of from about 20 to about 140 gsm. The thermoplastic polymer may have a melting point of from about 90° C. to about 250° C. and the second layer may have a basis weight of at least about 10 gsm. For example, the second layer may have a basis weight of from about 10 gsm to about 115 gsm. As another example, the second layer may have a basis weight of from about 17 gsm to about 115 gsm.

The second layer generally is bonded to the first layer by any means known to those having ordinary skill in the art. For example, the second layer may be bonded to the first surface of the first layer by means of an adhesive. As an example, the adhesive may be a heat-activated adhesive, such as an ethylene-acrylic acid copolymer. If desired, a release layer may be present between the first layer and the adhesive. Other adhesives, such as wet adhesives, curable adhesives, and the like may be employed.

Alternatively, the second layer may be thermally bonded to the first surface of the first layer. This is readily accomplished by heating the first and second layers in a press at a temperature sufficient to partially soften or melt a portion of the second layer which is adjacent to the first layer.

The second layer contains from about 0.1 to about 20 percent by weight, based on the weight of the polymer of which the second layer is composed, of a material which increases the viscosity of an ink jet ink when printed on the second layer. Such material may be, by way of illustration only, a poly(vinyl alcohol) or a polyoxyethylene. The second layer also may contain from about 0.1 to about 5 percent by weight, based on the weight of the polymer of which the second layer is composed, of a cationic polymer. For example, the cationic polymer may be a polyamide with cationic functional groups, an amide-epichlorohydrin resin, a polyethyleneimine, a polyacrylamide with cationic functional groups, or an urea-formaldehyde resin. Further, the second layer may contain, in amounts from about 0.1 to about 80 percent by weight of the polymer mass being transferred, a binder which functions as a meltable polymer adhesive (referred to as such hereinafter) which becomes part of the garment. For example, the meltable polymer adhesive may be an ethylene-acrylic acid copolymer, a vinyl chloride-acrylic acid copolymer, a polyacrylate, or a phenoxy resin.

The present invention additionally provides a method of preparing a printable material which involves providing a flexible first layer having first and second surfaces, the flexible first layer being a film or a cellulosic nonwoven web; providing a second layer which includes a nonwoven web formed from a natural or synthetic polymer; overlaying the second layer on the first surface of the first layer; and bonding the second layer to the first surface of the first layer. If the material is to be printed on with an ink jet printer, the method may further include treating the second layer with a composition which includes water and a material which increases the viscosity of an ink jet ink when printed on the second layer. Such material may be, by way of illustration only, a poly(vinyl alcohol) or a polyoxyethylene. Treating is carried out under conditions sufficient to provide an amount of the material in the second layer of from about 0.1 to about 20 percent by weight, on a dry weight basis, based on the weight of the second layer before treatment (i.e., based on the weight of the polymer of which the second layer is composed). The second layer also may be treated with a solution of a cationic polymer under conditions sufficient to provide an amount of cationic polymer in the second layer of from about 0.1 to about 5 percent by weight, again based on the weight of the second layer before treatment. The second layer may be treated sequentially with two different compositions containing the ink jet ink viscosity increasing material and the cationic polymer, respectively, or with a single composition containing both the ink jet ink viscosity increasing material and the cationic polymer. The first and second layers are as already defined.

The present invention also provides a method of preparing a printable material which involves providing a flexible first layer having first and second surfaces, the flexible first layer being a film or a cellulosic nonwoven web; providing a second layer which includes a nonwoven web formed from a natural or synthetic polymer; coating the first surface of the first layer with an adhesive; and overlaying the second layer on the adhesive coating to bond the second layer to the first layer. As with the preceding method, if the material is to be printed on with an ink jet printer, the method may further include treating the second layer with a composition which includes water and a material which increases the viscosity of an ink jet ink when printed on the second layer. Again, such material may be, by way of illustration only, a poly (vinyl alcohol) or a polyoxyethylene and treating is carried out under conditions sufficient to provide an amount of the material in the second layer of from about 0.1 to about 20 percent by weight, on a dry weight basis, based on the weight of the second layer before treatment. The second layer also may be treated with a solution of a cationic polymer under conditions sufficient to provide an amount of cationic polymer in the second layer of from about 0.1 to about 5 percent by weight, based on the weight of the second layer before treatment. The second layer may be treated sequentially with two different compositions containing the ink jet ink viscosity increasing material and the cationic polymer, respectively, or with a single composition containing both the ink jet ink viscosity increasing material and the cationic polymer. The first and second layers are as already defined.

In any of the foregoing methods, the use of a second layer prepared from a thermoplastic polymer permits the resulting material to be employed as a heat transfer material. This is particularly true where the thermoplastic polymer has a melting point of from about 90° C. to about 250° C. Where the resulting material is to be employed as a heat transfer material, any of the foregoing methods may further include treating the second layer with an aqueous dispersion of a meltable polymer adhesive which becomes part of the garment. Such treatment is carried out under conditions sufficient to provide an amount of the meltable polymer adhesive in the second layer which is from about 0.1 to about 80 percent by weight of the polymer mass being transferred. Treatment may be separate from or simultaneous with any or all other treatments required by any given method. For example, where treatments with a material which increases the viscosity of an ink jet ink when printed on the second layer, a cationic polymer, and a meltable polymer adhesive are required, three different treating solutions or compositions may be employed. As another example, two treating solutions or compositions may be utilized, with any two of the three materials being present in the same treating solution composition. As still another example, all three materials may be present in a single treating composition. Any given treating solution or composition may be applied by any method known to those having ordinary skill in the art, including those methods already indicated. Moreover, the same method may be employed for each treating solution or composition, or as many different methods as there are different treating solutions or compositions may be utilized.

The present invention further provides a method of preparing a material having durable graphic printed thereon which involves providing a flexible first layer having first and second surfaces, the flexible first layer being a film or a cellulosic nonwoven web; providing a second layer which includes a nonwoven web formed from a thermoplastic polymer; overlaying the second layer on the first surface of the first layer; bonding the second layer to the first surface of the first layer; printing an image on the treated second layer; and fusing the second layer. The first and second layers are as already defined. If the material is to be printed on with an ink jet printer, the method may further include treating the second layer with a composition which includes water and a material which increases the viscosity of an ink jet ink when printed on the second layer.

As used herein, the term "fusing" means that the second layer is heated under conditions which are sufficient to at least partially melt at least that portion of the second layer on which a graphic image has been printed. Heating may be carried out by any means known to those having ordinary skill in the art. Such methods include, by way of illustration only, passing the material between a heated nip, infrared heaters, ovens, hot air, and the like. Heating may involve all of the outermost surface of the second layer or only selected portions thereof, such as the portion on which the graphic image has been printed.

The present invention still further provides a method of preparing a material having durable graphics thereon which involves providing a printable material having a first layer and a second layer; printing an image on the second layer; and fusing the second layer. The printable material includes a flexible first layer having first and second surfaces, the flexible first layer being a film or a cellulosic nonwoven web and having a basis weight of from about 20 to about 140 grams per square meter; and a second layer which comprises a nonwoven web formed from a thermoplastic polymer, which second layer overlays and is bonded to the first surface of the first layer, has a melting point of from about 90° C. to about 250° C., and has a basis weight of at least about 10 gsm. The second layer may include from about 0.1 to about 20 percent by weight, on a dry weight basis, based on the weight of the second layer, of a material which increases the viscosity of an ink jet ink when printed on the second layer. The method also may include transferring the fused second layer to a fabric under the influence of heat and pressure.

DETAILED DESCRIPTION OF THE INVENTION

As used herein, the term "fibrous sheet-like material" is meant to include any fibrous material which typically is prepared by air laying or wet laying relatively short fibers to form a nonwoven web or sheet. Thus, the term includes nonwoven webs prepared from a papermaking furnish. Such furnish may include, by way of illustration, only cellulose fibers, a mixture of cellulosic fibers and noncellulosic fibers, or only noncellulosic fibers. When the furnish contains only cellulosic fibers or a mixture of cellulosic fibers and noncellulosic fibers, the resulting web is referred to herein as a "cellulosic nonwoven web." Noncellulosic fibers include, by way of illustration only, glass wool and fibers prepared from thermosetting and thermoplastic polymers, as is well known to those having ordinary skill in the art. Of course, the cellulosic nonwoven web also may contain additives and other materials, such as fillers, e.g., clay and titanium dioxide, as is well known in the papermaking art.

In general, the term "cellulosic fibers" is meant to include cellulosic fibers from any source. Sources of cellulosic fibers include, by way of illustration only, woods, such as softwoods and hardwoods; straws and grasses, such as rice, esparto, wheat, rye, and sabai; bamboos; jute; flax; kenaf; cannabis; linen; ramie; abaca; sisal; and cotton and cotton linters. Softwoods and hardwoods are the more commonly used sources of cellulosic fibers. In addition, the cellulosic fibers may be obtained by any of the commonly used pulping processes, such as mechanical, chemimechanical, semichemical, and chemical processes. For example, softwood and hardwood Kraft pulps are desirable for toughness and tear strength, but other pulps, such as recycled fibers, sulfite pulp, and the like may be used, depending upon the application.

As used herein, the term "thermosetting polymer" means a crosslinked polymer which does not flow when heated; once set at a temperature critical for a given material, a thermosetting polymer cannot be resoftened and reworked. Examples of thermosetting polymers include, by way of illustration only, alkyd resins, such as phthalic anhydride-glycerol resins, maleic acid-glycerol resins, adipic acid-glycerol resins, and phthalic anhydride-pentaerythritol resins; allylic resins, in which such monomers as diallyl phthalate, diallyl isophthalate diallyl maleate, and diallyl chlorendate serve as nonvolatile cross-linking agents in polyester compounds; amino resins, such as aniline-formaldehyde resins, ethylene urea-formaldehyde resins, dicyandiamide-formaldehyde resins, melamine-formaldehyde resins, sulfonamide-formaldehyde resins, and urea-formaldehyde resins; epoxy resins, such as cross-linked epichlorohydrin-bisphenol A resins; phenolic resins, such as phenol-formaldehyde resins, including Novolacs and resols; and thermosetting polyesters, silicones, and urethanes.

The term "thermoplastic polymer" is used herein to mean any polymer which softens and flows when heated; such a polymer may be heated and softened a number of times without suffering any basic alteration in characteristics, provided heating is below the decomposition temperature of the polymer. Examples of thermoplastic polymers include, by way of illustration only, end-capped polyacetals, such as poly(oxymethylene) or polyformaidehyde, poly(trichloroacetaldehyde), poly(n-valeraldehyde), poly(acetaldehyde), and poly(propionaldehyde); acrylic polymers, such as polyacrylamide, poly(acrylic acid), poly(methacrylic acid), poly(ethyl acrylate), and poly(methyl methacrylate); fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), and poly(vinyl fluoride); polyamides, such as poly(6-aminocaproic acid) or poly(e-caprolactam), poly(hexamethylene adipamide), poly(hexamethylene sebacamide), and poly(11-aminoundecanoic acid); polyaramides, such as poly(imino-1,3-phenyleneiminoisophthaloyl) or poly(m-phenylene isophthalamide); parylenes, such as poly-p-xylylene and poly(chloro-p-xylylene); polyaryl ethers, such as poly(oxy-2,6-dimethyl-1,4-phenylene) or poly(p-phenylene oxide); polyaryl sulfones, such as poly(oxy-1,4-phenylenesulfonyl-1,4-phenyleneoxy-1,4-phenylene-isopropylidene-1,4-phenylene) and poly(sulfonyl-1,4-phenyleneoxy-1,4-phenylenesulfonyl-4,4'-biphenylene); polycarbonates, such as poly(bisphenol A) or poly(carbonyldioxy-1,4-phenyleneisopropylidene-1,4-phenylene); polyesters, such as poly(ethylene terephthalate), poly(tetramethylene terephthalate), and poly-(cyclohexylene-1,4-dimethylene terephthalate) or poly(oxymethylene-1,4-cyclohexylenemethyleneoxyterephthaloyl); polyaryl sulfides, such as poly(p-phenylene sulfide) or poly(thio-1,4-phenylene); polyimides, such as poly(pyromellitimido-1, 4-phenylene); polyolefins, such as polyethylene, polypropylene, poly(1-butene), poly(2-butene), poly(1-pentene), poly(2-pentene), poly(3-methyl-1-pentene), and poly(4-methyl-1-pentene); vinyl polymers, such as poly(vinyl acetate), poly(vinylidene chloride), and poly(vinyl chloride); diene polymers, such as 1,2-poly-1,3-butadiene, 1,4-poly-1,3-butadiene, polyisoprene, and polychloroprene; polystyrenes; copolymers of the foregoing, such as acrylonitrile-butadiene-styrene (ABS) copolymers; and the like.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "cationic polymer" is meant to include any water-soluble polymer containing cationic functional groups. For example, the cationic polymer may be an amide-epichlorohydrin polymer, a polyacrylamide with cationic functional groups, polyethyleneimine, polydiallylamine, a quaternary polycationic synthetic organic polymer, a polyacrylamide with cationic functional groups, or the like.

The term "nonwoven web" is used herein to mean a web of fibers in which the fibers are laid down in a random manner. Thus, a nonwoven web may be formed by such processes as wet laying, dry laying, meltblowing, coforming, spunbonding, and carding and bonding.

The term "meltblown web" means a nonwoven web prepared by well-known meltblowing processes. By way of illustration only, such processes are exemplified by the following references, each of which is incorporated herein by reference:

(a) meltblowing references include, by way of example, U.S. Pat. No. 3,016,599 to R. W. Perry, Jr., U.S. Pat. No. 3,704,198 to J. S. Prentice, U.S. Pat. No. 3,755,527 to J. P. Keller et al., U.S. Pat. No. 3,849,241 to R. R. Butin et al., U.S. Pat. No. 3,978,185 to R. R. Butin et al., and U.S. Pat. No. 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973); and (b) coforming references (i.e., references disclosing a meltblowing process in which fibers or particles are commingled with the meltblown fibers as they are formed) include U.S. Pat. No. 4,100,324 to R. A. Anderson et al. and U.S. Pat. No. 4,118,531 to E. R. Hauser.

Spunbonded nonwoven webs are made from fibers which are formed by extruding a molten thermoplastic material as filaments from a plurality of fine, usually circular, capillaries in a spinneret with the diameter of the extruded filaments then being rapidly reduced, for example, by non-eductive or eductive fluid-drawing or other well known spunbonding mechanisms. The production of spunbonded nonwoven webs is illustrated in such patents as U.S. Pat. No. 3,276,944 to Levy; U.S. Pat. Nos. 3,338,992 and 3,341,394 to Kinney; U.S. Pat. No. 3,502,538 to Peterson; U.S. Pat. No. 3,502,763 to Hartman; U.S. Pat. No. 3,542,615 to Dobo et al.; U.S. Pat. No. 3,655,862 to Dorschner et al.; U.S. Pat. No. 3,692,618 to Dorschner et al.; U.S. Pat. No. 3,705,068 to Dobo et al.; U.S. Pat. No. 3,802,817 to Matsuki et al.; U.S. Pat. No. 3,853,651 to Porte; U.S. Pat. No. 4,064,605 to Akiyama et al.; U.S. Pat. No. 4,091,140 to Harmon; U.S. Pat. No. 4,100,319 to Schwartz; U.S. Pat. No. 4,340,563 to Appel and Morman; U.S. Pat. No. 4,405,297 to Appel and Morman; U.S. Pat. No. 4,434,204 to Hartman et al.; U.S. Pat. No. 4,627,811 to Greiser and Wagner; and U.S. Pat. No. 4,644,045 to Fowells; and Canadian Patent No. 803,714 to Harmon.

The term "material which increases the viscosity of an ink jet ink when printed on the second layer" is intended to include any material which acts as an ink jet ink viscosity modifier as described herein. For example, such material may be, by way of illustration only, a poly(vinyl alcohol) or a polyoxyethylene or poly(ethylene glycol). When a poly(ethylene glycol) is employed, it desirably will be a poly(ethylene glycol) having a weight-average molecular weight of from about 100,000 to about 2,000,000. The poly(ethylene glycol) desirably will have a weight-average molecular weight of from about 100,000 to about 600,000.

As noted above, the ink jet printable material of the present invention includes a flexible first layer having first and second surfaces and a second layer. The first layer may be a film or a fibrous sheet-like material. For example, the first layer may be a cellulosic nonwoven web. As another example, the first layer may be a latex-impregnated paper.

The second layer overlays and is bonded to the first surface of the first layer and includes a nonwoven web formed from a natural or synthetic polymer. Natural polymers include hydrocarbons such as rubber and gutta percha (polyisoprene). A synthetic polymer generally may be a thermosetting or a thermoplastic polymer. The first layer may have a basis weight of from about 20 to about 140 grams per square meter (gsm). The second layer may have a basis weight of at least about 10 gsm. For example, the second layer may have a basis weight of from about 10 gsm to about 115 gsm. As another example, the second layer may have a basis weight of from about 17 gsm to about 115 gsm.

The second layer generally is bonded to the first layer by any means known to those having ordinary skill in the art. For example, the second layer may be bonded to the first surface of the first layer by means of an adhesive. As an example, the adhesive may be a heat-activated adhesive, such as an ethylene-acrylic acid copolymer. Other adhesives, such as wet adhesives, curable adhesives, and the like may be employed. If desired, a release layer may be present between the first layer and the adhesive. For example, the release layer may be composed of a silicone or a polyethylene or ethylene copolymer film.

Alternatively, the second layer may be thermally bonded to the first surface of the first layer. This may be accomplished by placing a meltable web between the two layers and heating them in a press at a temperature sufficient to partially soften or melt the meltable web. The meltable web typically will be prepared from a thermoplastic polymer having a suitably low softening or melting point. The use of such webs is well known to those having ordinary skill in the art. When the second layer has been prepared from a thermoplastic polymer, the first and second layers may be heated in a press at a temperature sufficient to partially soften or melt a portion of the second layer which is adjacent to the first layer.

The second layer may contain from about 0.1 to about 20 percent by weight, based on the weight of the second layer, of a material which increases the viscosity of an ink jet ink when printed on the second layer. Such material may be, by way of illustration only, a poly(vinyl alcohol) or a polyoxyethylene. Such material may be, by way of illustration only, a poly(vinyl alcohol) or a polyoxyethylene. It may be applied by any convenient means to the second layer. For example, the material may be dissolved in a suitable solvent, such as water, and applied to the second layer by Meyer rod, doctor blade, spraying, dipping and nipping, gravure printing, or other known method.

The second layer also may contain from about 0.1 to about 5 percent by weight, based on the weight of the second layer, of a cationic polymer. Examples of cationic polymers include, by way of illustration only, polyamides, amide-epichlorohydrin resins, polyethyleneimines, polyacrylamides, and urea-formaldehyde resins. As with the ink viscosity-reducing material, the cationic polymer may be dissolved in a suitable solvent, such as water, and applied in a similar manner. If desired, both the ink viscosity-reducing material and the cationic polymer may be present in the same solution.

The present invention further provides an ink jet printable heat transfer material which includes a flexible first layer having first and second surfaces and a second layer. The first layer may be a film or a fibrous sheet-like material. For example, the fibrous sheet-like material may be a cellulosic nonwoven web. As another example, the first layer may be a latex-impregnated paper.

The second layer overlays and is bonded to the first surface of the first layer and includes a nonwoven web formed from a thermoplastic polymer. For example, the second layer may be a meltblown web formed from, by way of example only, a polyamide. The first layer may have a basis weight of from about 20 to about 140 gsm. The thermoplastic polymer may have a melting point of from about 90° C. to about 250° C. and the second layer may have a basis weight of at least about 10 gsm. For example, the second layer may have a basis weight of from about 10 gsm to about 115 gsm. As another example, the second layer may have a basis weight of from about 17 gsm to about 115 gsm.

The second layer generally is bonded to the first layer by any means known to those having ordinary skill in the art. For example, the second layer may be bonded to the first surface of the first layer by means of an adhesive. As an example, the adhesive may be a heat-activated adhesive, such as an ethylene-acrylic acid copolymer. If desired, a release layer may be present between the first layer and the adhesive. Other adhesives, such as wet adhesives, curable adhesives, and the like may be employed.

Alternatively, the second layer may be thermally bonded to the first surface of the first layer. This is readily accomplished by heating the first and second layers in a press at a temperature sufficient to partially soften or melt a portion of the second layer which is adjacent to the first layer.

The second layer may contain from about 0.1 to about 20 percent by weight, based on the weight of the second layer, of a material which increases the viscosity of an ink jet ink when printed on the second layer. For example, the second layer may contain from about 0.1 to about 5 percent by weight of the ink viscosity-increasing material. Such material may be, by way of illustration only, a poly(vinyl alcohol) or a polyoxyethylene. It may be applied by any convenient means to the second layer. For example, the material may be dissolved in a suitable solvent, such as water, and applied to the second layer by Meyer rod, doctor blade, spraying, dipping and nipping, gravure printing, or other known method. The second layer also may contain from about 0.1 to about 5 percent by weight, based on the weight of the second layer, of a cationic polymer. The cationic polymer may be applied as a solution in a like manner.

The second layer additionally may contain latex binders or meltable polymer adhesives, fillers and pigments, and/or particles of thermoplastic polymers, as desired. In general, any latex binder typically employed to prepare a saturated paper may be used as the meltable polymer adhesive. Examples of such binders are shown in Table A, below. In the table, the terms "acrylic" and "acrylate" include "methacrylic" and "methacrylate," respectively.

TABLE A

Examples of Suitable Binder Latices for Second Layer

| Polymer Type | Product Identification |
| --- | --- |
| Polyacrylates | Hycar ® 26083, 26084, 26120, 26104, 26106, 26322, B. F. Goodrich Company, Cleveland, Ohio |
| | Rhoplex ® HA-8, HA-12, NW-1715, Rohm and Haas Company, Philadelphia, Pennsylvania |
| | Carboset ® XL-52, B. F. Goodrich Company, Cleveland, Ohio |
| Poly(acrylic acid) | Rhoplex ® B-15, Rohm and Haas Company, Philadelphia, Pennsylvania |
| | Hycar ® 26672, B. F. Goodrich Company, Cleveland, Ohio |
| Styrene-butadiene copolymers | Butofan ® 4264, BASF Corporation, Samia, Ontario, Canada |
| | DL-219, DL-283, Dow Chemical Company, Midland, Michigan |
| Ethylene-vinyl acetate copolymers | Dur-O-Set ® E-666, E-646, E-669, National Starch & Chemical Co., Bridgewater, New Jersey |
| Nitrile rubbers | Hycar ® 1572, 1577, 1570x55, B. F. Goodrich Company, Cleveland, Ohio |
| Poly(vinyl chloride) | Vycar ® 352, B. F. Goodrich Company, Cleveland, Ohio |
| Poly(vinyl acetate) | Vinac ® XX-210, Air Products and Chemicals, Inc. Napierville, Illinois |
| Ethylene-acrylic acid copolymers | Michem ® Prime 4990, Michelman, Inc., Cincinnati, Ohio Adcote ® 56220, Morton Thiokol, Inc., Chicago, Illinois |

As noted earlier, the meltable polymer adhesive typically will be present in the second layer at a level of from about 0.1 to about 80 percent by weight of the polymer mass being transferred. For example, the meltable polymer adhesive may be present at a level of from about 0.1 to about 40 percent by weight.

In general, any of the fillers and pigments typically present in a papermaking furnish may be included with the meltable polymer adhesive. Examples of such fillers and pigments include, by way of illustration only clay, talc, silica, titanium dioxide; and colored pigments. Fillers and pigments may be present in the second layer at levels of from about 0.1 to about 40 percent by weight, based on the amount of the meltable polymer adhesive on a dry weight basis. Where the printable material is to be employed as a heat transfer material, the amount of fillers and pigments present in the second layer may vary from about 0.1 to about 5 percent by weight.

Finally, particles of thermoplastic polymers also may be present in the second layer. In general, the powdered thermoplastic polymer can be any thermoplastic polymer which meets the criteria set forth herein. For example, the powdered thermoplastic polymer may be a polyolefin, polyester, polyamide, or an ethylene-vinyl acetate copolymers. Such particles may be present in the second layer at levels of from about 0.1 to about 40 percent by weight, based on the amount of the meltable polymer adhesive on a dry weight basis. Where the printable material is to be employed as a heat transfer material, the amount of thermoplastic particles present in the second layer may vary from about 0.1 to about 5 percent by weight.

Thus, the heat transfer material of the present invention is a nonwoven web laminated to a flexible substrate. A small amount of an additive, desirably from about 0.1 to about 5 percent, based on the weight of the nonwoven web, is added to prevent ink spreading or feathering. This additive is the viscosity increasing material already described. Also as already described, the material may be applied to the nonwoven web as, for example, a water solution, and then dried. Poly(vinyl alcohol) and polyoxyethylene or poly(ethylene oxide) have been shown to be very effective at low add-ons. This is probably due to their ability to provide high viscosity to the inks very rapidly before spreading can occur.

Advantages of the ink jet printable material of the present invention include the wide availability of polymers for meltblown webs, ease of constructing a heavy, absorbent coating, and ease of fabricating a laminate. The resulting product appears to give less print feathering and, with the proper polymer selection, provides a heat transfer material which imparts good washability of fabrics to which images were transferred by means of the heat transfer material of the present invention. Also, it is possible to use the concept to produce fusible ink jet printable, durable coatings. Yarns possibly may be made by slitting and twisting the meltblown webs.

The ink jet printable heat transfer material of the present invention may contain, in amounts from zero to about 80 percent by weight of the polymer mass being transferred, a meltable polymer adhesive which becomes part of the garment. By way of illustration, the meltable polymer adhesive may be present in an amount of from about 0.1 to about 80 percent by weight. For example, the meltable polymer adhesive may be an ethylene-acrylic acid copolymer, a vinyl chloride-acrylic acid copolymer, a polyacrylate, or a phenoxy resin. The total weight of the transferable polymer mass typically is from about 25 to about 70 gsm. Thus far, heat transfer materials having a high proportion of meltblown polymer (i.e., relatively low amounts of meltable adhesive) have been most effective. The heavier meltblown webs provide more surface area for rapid ink absorption, and the presence of polymer in higher proportions provides better ink retention (better washability of the transferred image). With pigmented ink jet inks or with other pigmented printing methods, it is expected that polymer types other than the polyamides employed in the examples would provide acceptable washability as well.

As already stated, the heat transfer material may have a release coat or layer, whether or not an adhesive layer is employed for bonding the second layer to the first layer. A release layer is desirable for transferring images by means of a hand-held iron or if cold release properties are desired.

The present invention additionally provides a method of preparing a printable material which involves providing a flexible first layer having first and second surfaces, the flexible first layer being a film or a cellulosic nonwoven web; providing a second layer which includes a nonwoven web formed from a natural or synthetic polymer; overlaying the second layer on the first surface of the first layer; and bonding the second layer to the first surface of the first layer.

If the material is to be printed on with an ink jet printer, the method may further include treating the second layer with a composition which includes water and a material which increases the viscosity of an ink jet ink when printed on the second layer. Such material may be, by way of illustration only, a poly(vinyl alcohol) or a polyoxyethylene. Treating is carried out under conditions sufficient to provide an amount of the material in the second layer of from about 0.1 to about 20 percent by weight, on a dry weight basis, based on the weight of the second layer before treatment (i.e., based on the weight of the polymer of which the second layer is composed). The second layer also may be treated with a solution of a cationic polymer under conditions sufficient to provide an amount of cationic polymer in the second layer of from about 0.1 to about 5 percent by weight, again based on the weight of the second layer before treatment. The second layer may be treated sequentially with two different compositions containing the ink jet ink viscosity increasing material and the cationic polymer, respectively, or with a single composition containing both the ink jet ink viscosity increasing material and the cationic polymer. The first and second layers are as already defined.

The present invention also provides a method of preparing a printable material which involves providing a flexible first layer having first and second surfaces, the flexible first layer being a film or a cellulosic nonwoven web; providing a second layer which includes a nonwoven web formed from a natural or synthetic polymer; coating the first surface of the first layer with an adhesive; and overlaying the second layer on the adhesive coating to bond the second layer to the first layer. As with the preceding method, if the material is to be printed on with an ink jet printer, the method may further include treating the second layer with a composition which includes water and a material which increases the viscosity of an ink jet ink when printed on the second layer. Again, such material may be, by way of illustration only, a poly(vinyl alcohol) or a polyoxyethylene and treating is carried out under conditions sufficient to provide an amount of the material in the second layer of from about 0.1 to about 20 percent by weight, on a dry weight basis, based on the weight of the second layer before treatment. The second layer also may be treated with a solution of a cationic polymer under conditions sufficient to provide an amount of cationic polymer in the second layer of from about 0.1 to about 5 percent by weight, based on the weight of the second layer before treatment. The second layer may be treated sequentially with two different compositions containing the ink jet ink viscosity increasing material and the cationic polymer, respectively, or with a single composition containing both the ink jet ink viscosity increasing material and the cationic polymer. The first and second layers are as already defined.

In any of the foregoing methods, the use of a second layer prepared from a thermoplastic polymer permits the resulting material to be employed as a heat transfer material. This is particularly true where the thermoplastic polymer has a melting point of from about 90° C. to about 250° C. Where the resulting material is to be employed as a heat transfer material, any of the foregoing methods may further include treating the second layer with an aqueous dispersion of a meltable polymer adhesive which becomes part of the garment. Such treatment is carried out under conditions sufficient to provide an amount of the meltable polymer adhesive in the second layer which is from about 0.1 to about 80 percent by weight of the polymer mass being transferred. Treatment may be separate from or simultaneous with any or all other treatments required by any given method. For example, where treatments with a material which increases the viscosity of an ink jet ink when printed on the second layer, a cationic polymer, and a meltable polymer adhesive are required, three different treating solutions or compositions may be employed. As another example, two treating solutions or compositions may be utilized, with any two of the three materials being present in the same treating solution composition. As still another example, all three materials may be present in a single treating composition. Any given treating solution or composition may be applied by any method known to those having ordinary skill in the art, including those methods already indicated. Moreover, the same method may be employed for each treating solution or composition, or as many different methods as there are different treating solutions or compositions may be utilized.

The present invention further provides a method of preparing a material having durable graphic printed thereon which involves providing a flexible first layer having first and second surfaces, the flexible first layer being a film or a cellulosic nonwoven web; providing a second layer which includes a nonwoven web formed from a thermoplastic polymer; overlaying the second layer on the first surface of the first layer; bonding the second layer to the first surface of the first layer; printing an image on the treated second layer; and fusing the second layer. The first and second layers are as already defined. If the material is to be printed on with an ink jet printer, the method may further include treating the second layer with a composition which includes water and a material which increases the viscosity of an ink jet ink when printed on the second layer.

As used herein, the term "fusing" means that the second layer is heated under conditions which are sufficient to at least partially melt at least that portion of the second layer on which a graphic image has been printed. Heating may be carried out by any means known to those having ordinary skill in the art. Such methods include, by way of illustration only, passing the material between a heated nip, infrared heaters, ovens, hot air, and the like. Heating may involve all of the outermost surface of the second layer or only selected portions thereof, such as the portion on which the graphic image has been printed.

The present invention still further provides a method of preparing a material having durable graphics thereon which involves providing a printable material having a first layer and a second layer; printing an image on the second layer; and fusing the second layer. The printable material includes a flexible first layer having first and second surfaces, the flexible first layer being a film or a cellulosic nonwoven web and having a basis weight of from about 20 to about 140 grams per square meter; and a second layer which comprises a nonwoven web formed from a thermoplastic polymer, which second layer overlays and is bonded to the first surface of the first layer, has a melting point of from about 90° C. to about 250° C., and has a basis weight of at least about 10 gsm. The second layer may include from about 0.1 to about 20 percent by weight, on a dry weight basis, based on the weight of the second layer, of a material which increases the viscosity of an ink jet ink when printed on the second layer. The method also may include transferring the fused second layer to a fabric under the influence of heat and pressure.

The present invention is further described by the examples which follow. Such examples, however, are not to be construed as limiting in any way either the spirit or the scope of the present invention.

EXAMPLES

The examples all utilized meltblown webs prepared with a copolyamide having a melting point of 115° C. (Platamid®

H585, Elf Atochem North America, Inc., Philadelphia, Pa.). Meltblown webs having basis weights of 12.5, 18, 36, and 54 gsm were prepared. The meltblown copolyamide fibers were very slow to harden, resulting in a blocked roll. The material was, however, successfully wound onto release paper. After hardening, the resulting webs were strongly bonded and very porous. Unlike webs of faster hardening polymers such as polypropylene, the webs were somewhat film-like and it was difficult to abrade fibers from them. This very surprising result gave a laminate which behaves almost like a coated paper without any need for further bonding or other densification. Print tests were done with a Canon BJC 600 ink jet printer.

The first layers employed in the examples were as follows:

FL-A

First Layer A was a commercial grade of a silicone coated Kraft paper.

FL-B

This first layer was a litho label base coated on the backside with 1.8 mils (0.046 mm) of, a 500 melt index ethylene-methacrylic acid copolymer (Nucrel® 599, E. I. Du Pont de Nemours and Company, Inc., Wilmington, Del.).

FL-C

First Layer C was a Kraft saturating base having a basis weight of 75 gsm and saturated to 50 gsm pickup with a hard acrylic latex (Hycar® 26672, B. F. Goodrich Company, Cleveland, Ohio) containing 20 parts of $TiO_2$ per 100 parts of latex on a dry weight basis. The resulting saturated paper had a release coating consisting of a mixture of Hycar® 26672, 20 parts of calcium stearate (Nopcote® C-104, Henkle Corporation, Ambler, Pa.), 20 parts of a poly (ethylene oxide) having a weight-average molecular weight of 20,000, and 3 parts of a polyethoxylated octylphenol surfactant (Triton® X-100, Rohm & Haas Co., St. Louis, Mo.). The coating weight was 16 gsm. The paper had a tie coat over the release coat which consisted of a water-dispersed ethylene-acrylic acid copolymer (Michem® Prime 4983, Michelman, Inc., Cincinnati, Ohio); the coating basis weight was 6 gsm.

FL-D

This first layer was a Kraft saturating base with a 30-gsm pickup of a saturant consisting of a mixture of Hycar® 26672 and 20 parts by weight of titanium dioxide per 100 parts of latex on a dry weight basis. The paper had a release coating of 14 gsm of a mixture of 10 parts of Hycar® 26672, 20 parts Nopcote® C-104, 10 parts of the polyethylene glycol described with regard to FL-C, and 30 parts of Celite® 263 (Manville Products Corporation, Denver, Colo.), a diatomaceous earth flatting agent, all parts by weight on a dry weight basis.

A variety of aqueous solutions were employed to treat the nonwoven webs or second layers. These solutions are summarized in Table 1 (all percentages are by weight and all parts are by weight on a dry weight basis).

TABLE 1

Summary of Aqueous Treatment Solutions

| Code | Description |
|------|-------------|
| TS-A | 10 percent of a poly(vinyl alcohol) (Airvol® 523, Air Products and Chemicals, Inc., Allentown, PA). |
| TS-B | 5 percent of a poly(vinyl alcohol) (Airvol® 523). |
| TS-C | 6 percent total solids solution of 100 parts Airvol® 523 and 25 parts of a cationic polymer, Alcostat® 567 (Allied Colloids, Inc., Suffolk, VA). |

TABLE 1-continued

Summary of Aqueous Treatment Solutions

| Code | Description |
|------|-------------|
| TS-D | 7 percent total solids solution of 100 parts Airvol® 523 and 50 parts of Alcostat® 567. |
| TS-E | 13.9 percent total solids, 100 parts Michem® Prime 4983 and 25 parts Airvol® 523. |
| TS-F | 17.3 percent total solids, 100 parts Michem® Prime 4983 and 12.5 parts of Airvol® 523. |
| TS-G | 18 percent total solids, 66 parts Michem® Prime 4983, 33 parts of a polystyrene pigment, Rhopaque® OP 84 (Rohm and Haas Company, Philadelphia, PA), and 12.5 parts Airvol® 523. |
| TS-H | 18 percent total solids, 66 parts Rhopaque® OP 84, 33 parts Michem® Prime 4983, 12.5 parts Airvol® 523. |
| TS-I | 12 percent total solids, 100 parts Airvol® 523, 100 parts Alcostat® 567, 100 parts Airflex® 140 (an ethylene-vinyl acetate latex from Air Products). |
| TS-J | 13.2 percent solids, 100 parts Airflex® 140, 50 parts of Alcostat® 567, 50 parts of Airvol® 523. |
| TS-K | 17.9 percent solids, 100 parts of a poly(vinyl chloride)-acrylic acid latex, Vycar® 460x49 (B. F. Goodrich Company, Cleveland, OH) and 25 parts Airvol® 523. |
| TS-L | 17.9 percent solids, 100 parts Hycar® 26672 and 25 parts Airvol® 523. |
| TS-M | 5 percent solids, 100 parts Airvol® 523 and 10 parts of a cationic wet strength resin (Kymene® 557LX, Hercules, Inc., Wilmington, DE). |
| TS-N | 5 percent solids solution of Airvol® 325 (a fully hydrolyzed poly(vinyl alcohol) of medium viscosity) (Air Products and Chemicals, Inc., Allentown, PA). |
| TS-O | 5 percent solids solution of Airvol® 125 (a super hydrolyzed poly(vinyl alcohol)) (Air Products and Chemicals, Inc., Allentown, PA). |
| TS-P | 15 percent solids solution of 100 parts of Paphen® PKHW-35 (a phenoxy resin latex from Phenoxy Associates, Rock Hill, SC) and 25 parts of Airvol® 523. |
| TS-Q | 2.5 percent solids solution of Polyox® N60K, a polyoxyethylene from Union Carbide Corporation, Danbury, CT. |

Treatment weights were calculated from a wet coating weight since the treatment weights were quite small compared to the total laminate weight. Transfers were done to 100 percent cotton T-shirt material with a Hix T-shirt press (Hix Corp., Pittsburgh, Kans.) for 25 seconds at 350° F. (177° C.). Wash tests were done in a home washing machine on the warm/warm setting using Surf® detergent. Test results were compared to printing and transfers made with Type C-90642 heat transfer paper, a product which has gained acceptance in the market.

Various heat transfer materials were prepared by pressing the meltblown webs onto a paper substrate using the T-shirt press at 160° F. (71° C.) for 25 seconds. The treatment solutions were applied to the meltblown webs with a No. 6 Meyer rod. The various materials are summarized in Table 2 and the printing and washing test results are summarized in Table 3.

TABLE 2

Summary of Heat Transfer Materials

| | First Layer | Second Layer | Treatment | |
|---|---|---|---|---|
| Example | Code | Basis Weight[a] | Weight[a] | Solution |
| 1 | A | 12.5 | None | None |
| 2 | A | 18 | None | None |
| 3 | B | 12.5 | None | None |
| 4 | A | 18 | 1.6 | A |
| 5 | A | 18 | 0.8 | B |
| 6 | B | 18 | 0.8 | C |
| 7 | B | 18 | 0.8 | D |

TABLE 2-continued

Summary of Heat Transfer Materials

| Example | First Layer Code | Second Layer Basis Weight[a] | Treatment Weight[a] | Solution |
|---|---|---|---|---|
| 8 | C | 36 | 1.2 | D |
| 9 | C | 36 | 2.4 | E |
| 10 | C | 36 | 3.2 | F |
| 11 | C | 36 | 3.2 | G |
| 12 | C | 36 | 3.2 | H |
| 13 | C | 36 | 3.2 | I |
| 14 | C | 36 | 3.2 | J |
| 15 | C | 36 | 3.2 | K |
| 16 | C | 36 | 3.2 | L |
| 17 | C | 36 | 0.8 | M |
| 18 | C | 54 | 1.6 | A |
| 19 | C | 71 | 1.6 | A |
| 20 | C | 71 | 0.8 | B |
| 21 | C | 71 | None | None |
| 22 | D | 71 | 0.8 | N |
| 23 | D | 71 | 0.8 | M |
| 24 | D | 71 | 0.4 | Q |
| 25 | D | 71 | 0.4 | Q |
| 26 | D | 54 | 0.8 | A |
| 27 | C | 71 | 2.8 | P |

[a]Basis weight in gsm.

TABLE 3

Summary of Printing and Washing Tests

| Example | Print Test | Wash Test | Comments |
|---|---|---|---|
| 1 | Very poor | — | |
| 2 | Very poor | — | |
| 3 | Very poor | Poor | |
| 4 | Excellent | — | |
| 5 | Good | — | |
| 6 | Good | Poor | |
| 7 | Good | Poor | |
| 8 | Good | Fair | Cold peel sample |
| 9 | Good | Fair | Cold peel sample |
| 10 | Good | Fair | Cold peel sample |
| 11 | Good | Fair | Cold peel sample |
| 12 | Good | Fair | Cold peel sample |
| 13 | Good | Very poor | Cold peel sample |
| 14 | Good | Very poor | Cold peel sample |
| 15 | Good | Fair | Cold peel sample |
| 16 | Good | Fair | Cold peel sample |
| 17 | Good | Fair | Cold peel sample |
| 18 | Excellent | Fair | |
| 19 | Excellent | Fair | |
| 20 | Excellent | Good | |
| 21 | Very poor | Good | Soft image |
| 22 | Good | Good | Hard paper release |
| 23 | Good | Fair | Stiff image |
| 24 | Good | Good | Soft image |
| 25 | Good | Fair | Soft image |
| 26 | Good | Poor | |
| 27 | Good | Poor | Stiff image |

The results demonstrate a surprisingly good print with material having only small amounts of polyvinyl alcohol or polyoxyethlene. Latex has very little effect but Primacor® 4983, an ethylene-acrylic acid copolymer, seemed to help washability. Heavier meltblown webs print better and provide better washability.

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An ink jet printable material comprising:
    a flexible first layer having first and second surfaces, the flexible first layer being a film or a cellulosic nonwoven web having a basis weight of from about 20 to about 140 grams per square meter; and
    an ink receptive second layer having first and second surfaces, the first surface being ink printable with a printer and the second surface being overlaid and bonded to the first surface of the first layer, which second layer comprises a nonwoven web having a basis weight of at least 10 grams per square meter formed from a natural or synthetic polymer, and which second layer contains from about 0.1 to about 20 percent by weight, based on the weight of the second layer, of a material which increases the viscosity of an ink jet ink when printed on the second layer.

2. The ink jet printable material of claim 1, in which the first layer is a cellulosic nonwoven web.

3. The ink jet printable material of claim 2, in which the cellulosic nonwoven web is a latex-impregnated paper.

4. The ink jet printable material of claim 1, in which the second layer is bonded to the first surface of the first layer by means of an adhesive.

5. The ink jet printable material of claim 4, in which the adhesive is a heat-activated ethylene-acrylic acid copolymer.

6. The ink jet printable material of claim 1, in which the second layer is thermally bonded to the first surface of the first layer.

7. The ink jet printable material of claim 1, in which the material which increases the viscosity of an ink jet ink when printed on the second layer is selected from the group consisting of poly(vinyl alcohol) and polyoxyethylene.

8. The ink jet printable material of claim 1, in which the second layer contains from about 0.1 to about 5 percent by weight, based on the weight of the second layer, of a cationic polymer.

9. A method of preparing a printable material which comprises:
    providing a flexible first layer having first and second surfaces, the flexible first layer being a film or a cellulosic nonwoven web;
    providing a second layer which comprises a nonwoven web formed from a natural or synthetic polymer;
    overlaying the second layer on the first surface of the first layer; and
    bonding the second layer to the first surface of the first layer;
wherein:
    the first layer has a basis weight of from about 20 to about 140 grams per square meter; and
    the second layer has a basis weight of at least about 10 grams per square meter.

10. A method of preparing a printable material which comprises:
    providing a flexible first layer having first and second surfaces, the flexible first layer being a film or a cellulosic nonwoven web;
    treating the first surface of the first layer with an adhesive;
    providing a second layer which comprises a nonwoven web formed from a natural or synthetic polymer; and
    overlaying the second layer against the adhesive treating on the first surface of the first layer;

wherein:
　the first layer has a basis weight of from about 20 to about 140 grams per square meter; and
　the second layer has a basis weight of at least about 10 grams per square meter.

11. A method of preparing a material having durable graphics printed thereon which comprises:
　providing a flexible first layer having first and second surfaces, the flexible first layer being a film or a cellulosic nonwoven web;
　providing a second layer which comprises a nonwoven web formed from a thermoplastic polymer;
　overlaying the second layer on the first surface of the first layer;
　bonding the second layer to the first surface of the first layer;
　printing an image on the second layer; and
　fusing the printed second layer;
wherein:
　the first layer has a basis weight of from about 20 to about 140 grams per square meter; and
　the second layer has a basis weight of at least about 10 grams per square meter.

12. The method of claim 11 which further comprises transferring the fused second layer to a fabric under the influence of heat and pressure.

13. A method of preparing a material having durable graphics thereon, which method comprises:
　providing a printable material which comprises:
　　a flexible first layer having first and second surfaces, the flexible first layer being a film or a cellulosic nonwoven web, which first layer has a basis weight of from about 20 to about 140 grams per square meter; and
　　a second layer which comprises a nonwoven web formed from a thermoplastic polymer, which second layer overlays and is bonded to the first surface of the first layer, has a melting point of from about 90° C. to about 250° C., and has a basis weight of at least about 10 grams per square meter;
　printing an image on the second layer; and
　fusing the second layer.

14. The method of claim 13 which further comprises transferring the fused second layer to a fabric under the influence of heat and pressure.

* * * * *

UNITED STATES PATENT AND TRADEMARK OFFICE
CERTIFICATE OF CORRECTION

| | |
|---|---|
| PATENT NO. | : 6,703,086 B2 |
| DATED | : March 9, 2004 |
| INVENTOR(S) | : Francis Joseph Kronzer et al. |

It is certified that error appears in the above-identified patent and that said Letters Patent is hereby corrected as shown below:

Column 18,
Line 56, please add at the end of claim 9, after "meter", a subparagraph as follows:
-- where the second layer is treated with a composition comprising water and a material which increases the viscosity of an ink jet ink when printed on the second layer, under conditions sufficient to provide in the second layer from about 0.1 to about 20 percent by weight, based on the weight of the second layer, of said material --.

Column 19,
Line 5, please add at the end of claim 10, after "meter", a subparagraph as follows:
-- where the second layer is treated with a composition comprising water and a material which increases the viscosity of an ink jet ink when printed on the second layer, under conditions sufficient to provide in the second layer from about 0.1 to about 20 percent by weight, based on the weight of the second layer, of said material --.
Line 24, please add at the end of claim 11, after "meter", a subparagraph as follows:
-- wherein the second layer is treated before printing an image thereon, with a composition comprising water and a material which increases the viscosity of an ink jet ink when printed on the second layer, under conditions sufficient to provide in the second layer from about 0.1 to about 20 percent by weight, based on the weight of the second layer, of said material --.

Column 20,
Line 20, please add at the end of claim 13, after "layer", a subparagraph as follows:
-- wherein the second layer further comprises from about 0.1 to about 20 percent by weight, based on the weight of the second layer, of a material which increases the viscosity of an ink jet ink when printed on the second layer --.

Signed and Sealed this

Fourth Day of October, 2005

JON W. DUDAS
*Director of the United States Patent and Trademark Office*